(12) United States Patent
Li et al.

(10) Patent No.: US 6,963,731 B2
(45) Date of Patent: Nov. 8, 2005

(54) SIGNAL STRENGTH DISPLAY DEVICE FOR WIRELESS HUB

(75) Inventors: Jian-Huei Li, Hsin-Chu (TW); Chun-Yuan Lee, Taichung (TW)

(73) Assignee: Zyxel Communications Corporation, Hsin-Chu (TW)

(*) Notice: Subject to any disclaimer, the term of this patent is extended or adjusted under 35 U.S.C. 154(b) by 469 days.

(21) Appl. No.: 10/255,591

(22) Filed: Sep. 27, 2002

(65) Prior Publication Data
US 2004/0204193 A1    Oct. 14, 2004

(51) Int. Cl.$^7$ .............................. H04B 17/00
(52) U.S. Cl. .................. 455/67.7; 455/67.11; 455/423; 455/226.2
(58) Field of Search .................. 455/67.11, 67.15, 455/423, 424, 425, 446, 566, 435.1, 41.2, 455/452.2, 457, 557, 226.1, 226.2, 575.1, 455/435, 67.7; 709/208, 209; 340/539.1, 340/539.15

(56) References Cited

U.S. PATENT DOCUMENTS

| | | | |
|---|---|---|---|
| 6,150,936 A | * | 11/2000 | Addy ........................ 340/539.2 |
| 6,243,576 B1 | * | 6/2001 | Seike et al. .................. 455/423 |
| 2002/0086642 A1 | * | 7/2002 | Ou et al. ....................... 455/69 |

FOREIGN PATENT DOCUMENTS

| | | | | |
|---|---|---|---|---|
| GB | 2 275 848 A | * | 9/1994 | |
| JP | 2002-124962 A | * | 4/2002 | ........... H04L 12/28 |

OTHER PUBLICATIONS

Gray, "Optimal Hub Deployment for 28 GHz LMDS Systems", Wireless Communications Conference, 1997, IEEE Proceedings Aug., 1997, pp. 18-22.*

Qiaozhong et al., "Optimizing Relay Control in Wireless 1394 Network", 7th Internationation Symposium on Parallel Architectures, Algorithms and Networks, 2004, IEEE Proceedings, May 2004, pp. 54-59.*

* cited by examiner

*Primary Examiner*—Charles N. Appiah
(74) *Attorney, Agent, or Firm*—Rosenberg, Klein & Lee

(57) ABSTRACT

Signal strength display device for wireless Hub, which is disposed on a mother unit or daughter unit of the wireless Hub. The signal strength display device includes: a wireless transceiver circuit; a signal analyzing unit connected to the output terminal of said wireless transceiver circuit for calculating and analyzing the strength of the radio signal received by said wireless transceiver circuit to generate a corresponding value; an analog-to-digital converting unit connected with said signal analyzing unit for converting the value generated by said signal analyzing unit into digital data; and a display unit disposed on the housing of the wireless Hub for displaying the number of all the connected daughter units, the average value of the signal strength of all the connected daughter units or the value of signal strength of a certain daughter unit.

8 Claims, 5 Drawing Sheets

SIGNAL STRENGTH DISPLAY DEVICE FOR WIRELESS HUB

BACKGROUND OF THE INVENTION

1. Technical Field

The present invention is related to a signal strength display device for wireless Hub, and more particularly to a wireless transmission Hub used in Local Area Network (LAN). The signal strength display device is disposed on a mother unit or daughter unit of the wireless Hub to display the strength of the wirelessly transmitted signals between the mother unit and daughter unit.

2. Description of the Prior Art

The conventional the Hub used in Local Area Network (LAN) can be divided into cable transmission Hub and wireless transmission Hub. With respect to the wireless Hub 1, a wireless mother unit (referred to as mother unit hereinafter) 2 cooperates with multiple wireless daughter units or wireless network interface cards (referred to as daughter units hereinafter) 3. FIG. 1 shows the signal transmission of a conventional wireless Hub. The mother unit 2 generally via a network cable 4 is connected to the Host 5 or the network server. The daughter units 3 are connected with desktop personal computers 6 or notebooks distributed all around. The mother unit 2 and daughter units 3 wirelessly transmit data to each other without using network line 4. This is quite convenient. However, in the case that there are a number of widely distributed daughter units 3, the mother unit 2 must be located in an optimal position to wirelessly connect with all the daughter units 3.

In general, the daughter units 3 are fixed in certain positions, while the mother unit 2 must be positioned in an optimal location to wirelessly connect with most of the daughter units 3 for data transmission. However, both the mother unit and daughter units of the existent wireless Hub cannot truly indicate the signal strength in a certain position. Accordingly, it is impossible to locate the best position where the mother unit 2 should be placed. Moreover, the place where the mother unit 2 is positioned will affect the speed and correctness of data transmission between the mother unit 2 and the daughter units 3. Therefore, a mother unit 2 is additionally disposed in the connection position of the wireless transmission of the mother unit 2 and daughter units 3 so as to ensure correct transmission of the data. This leads to waste of resource.

It is therefore tried by the applicant to develop a signal strength display device for wireless Hub. The display device is disposed on the mother unit or daughter unit to show the wireless transmission signal strength. In a state that most of the daughter units are connected, an optimal location of the mother unit can be quickly found.

SUMMARY OF THE INVENTION

It is therefore a primary object of the present invention to provide a signal strength display device for wireless Hub, which is disposed on a mother unit or daughter unit of the wireless Hub. The signal strength display device includes: a wireless transceiver circuit; a signal analyzing unit connected to the output terminal of said wireless transceiver circuit for calculating and analyzing the strength of the radio signal received by said wireless transceiver circuit to generate a corresponding value; an analog-to-digital converting unit connected with said signal analyzing unit for converting the value generated by said signal analyzing unit into digital data; and a display unit disposed on the housing of the wireless Hub for displaying the value of strength of the received radio signal or the number of connected daughter units.

It is a further object of the present invention to provide the above signal strength display device for wireless Hub, in which the signal analyzing unit serves to calculate the number of all the connected daughter units, the average value of the signal strength of all the connected daughter units or the value of signal strength of one single connected daughter unit and then generate the corresponding values. The analog-to-digital converting unit serves to convert the values generated by the signal analyzing unit into digital data and output the digital data to the display unit to display the digital data.

The present invention can be best understood through the following description and accompanying drawings wherein:

DETAILED DESCRIPTION OF THE PREFERRED EMBODIMENTS

Figure 1:
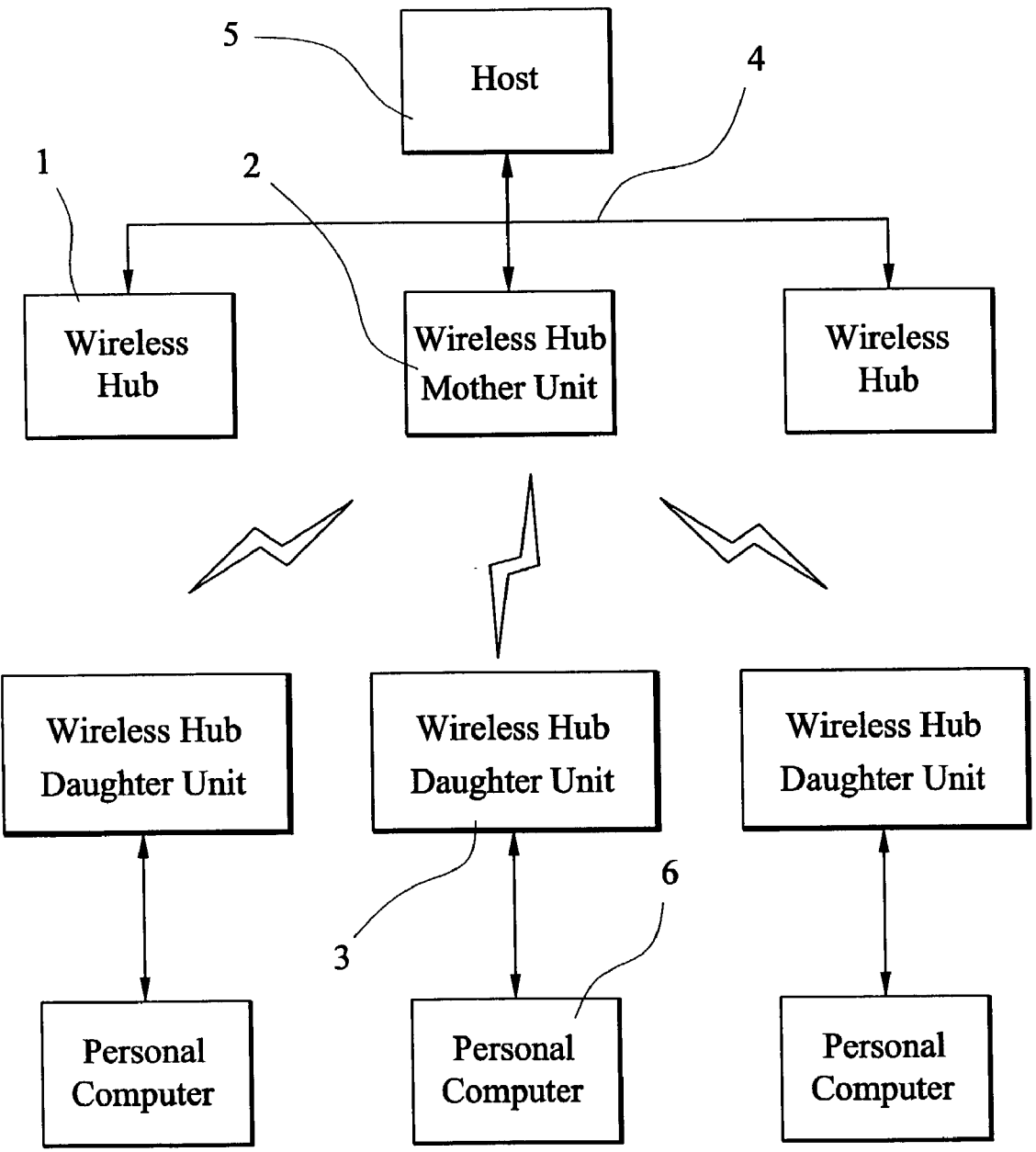
FIG. 1 is a block diagram showing signal transmission of a conventional wireless Hub.
Figure 2:
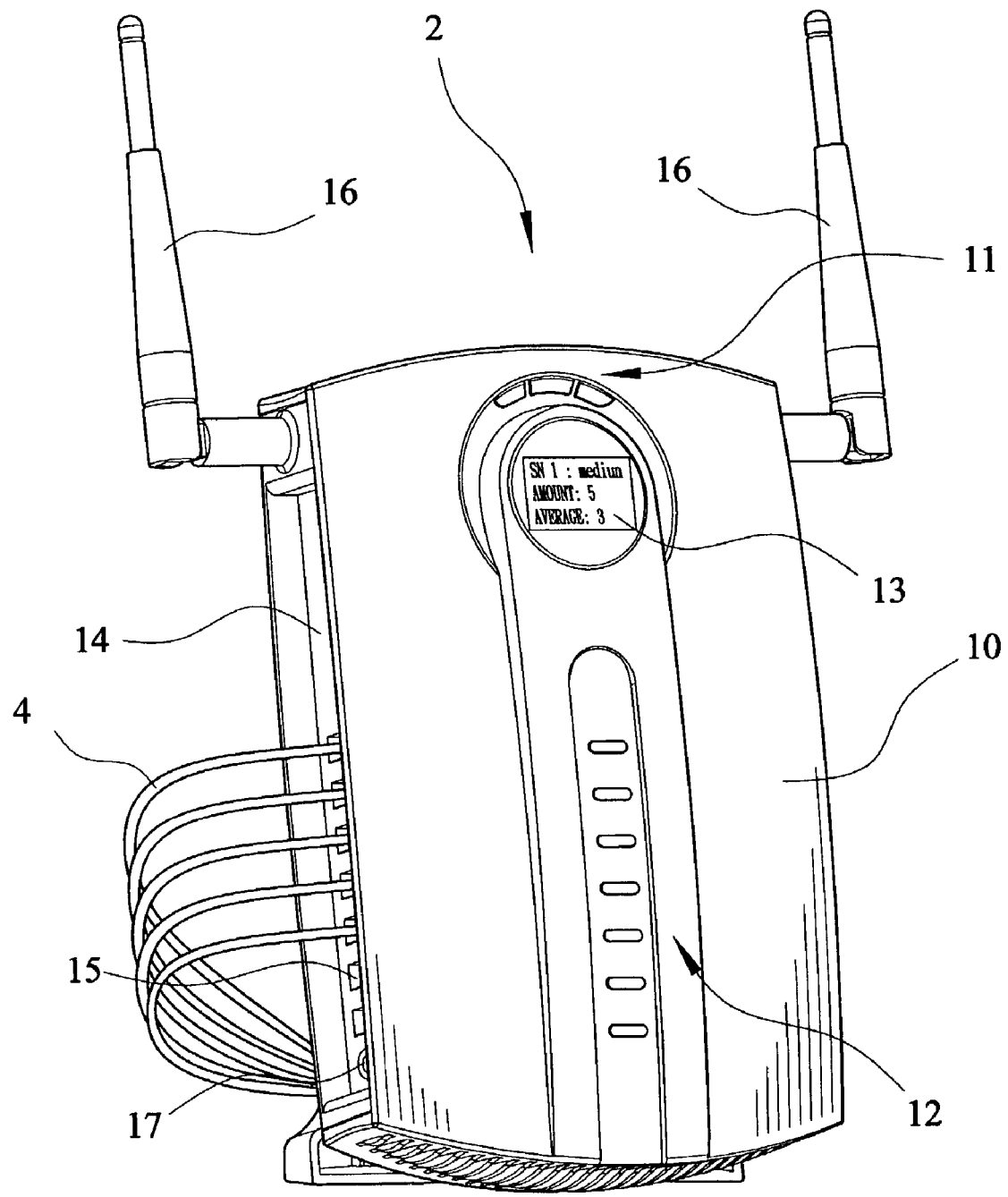
FIG. 2 is a perspective view showing that the signal strength display device of the present invention is mounted on a mother unit.

The present invention is related to a display device disposed on the mother unit or daughter unit of a wireless Hub for showing wireless transmission signal strength. Please first refer to FIG. 2 showing an embodiment of the present invention in which the signal strength display device is disposed on the mother unit 2. A power indicator lamp 11, multiple connection indicator lamps 12 and a signal strength display 13 are arranged on the front panel 10 of the housing of the wireless Hub of the mother unit 2. Multiple network cable 4 connecting jacks 15 are arranged on a side board 14 of the housing of the wireless Hub 1 for connecting with a Host 5 or personal computer 6 via said network cable 4. The connection indicator lamp 12 serves to indicate the connection state or transmission state of the connecting jack 15 of the wireless Hub 1. When said network cable 4 of the connecting jack 15 is successfully connected with the computer, the connection indicator lamp 12 will light. In the case of data transmission, the connection indicator lamp 12 will flicker.

Two antennas 16 are disposed on two sides of top end of the wireless Hub 1. The antennas 16 serve to receive or transmit radio signal for wirelessly connecting with the daughter unit 3 and transmitting data signals. A power input jack 17 is disposed on the side board 14 for inputting working power for the wireless Hub 1. When the power is input from the power input jack 17, the power indicator lamp 11 will light.

Figure 3:
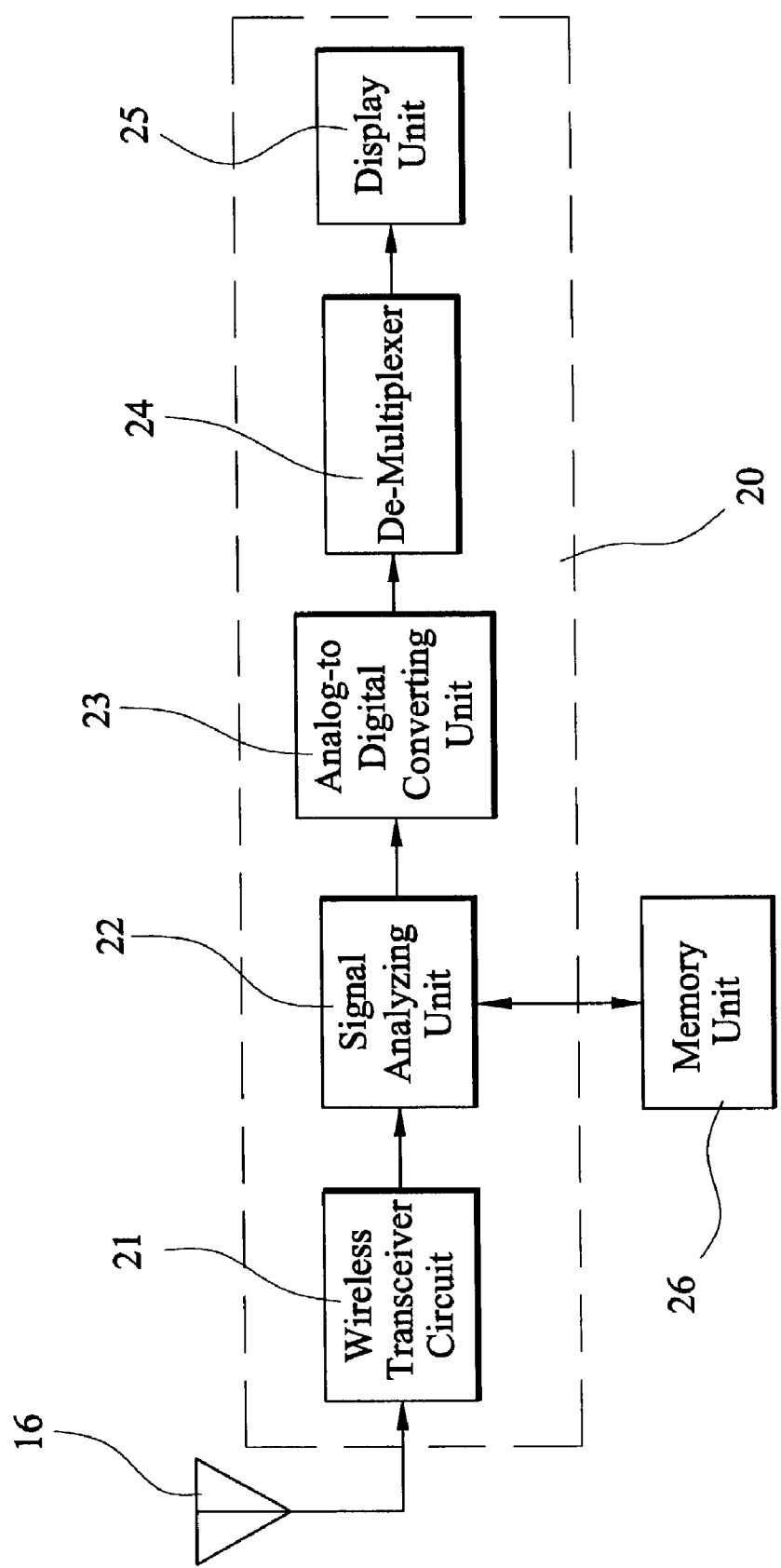
FIG. 3 is a block circuit diagram of the signal strength display device of the present invention.

Please refer to FIG. 3 which shows a circuit block diagram of the display device of the present invention. The antennas 16 receive the radio signal transmitted from the daughter unit 3 and then the signal strength display 13 shows the value of the signal strength. It is known from the prior art that one mother unit 2 can cooperate with multiple daughter units 3. Therefore, the signal strength display 13 of the mother unit 2 can show the number of all the connected daughter units 3 and display the average value of the radio signal strength of all the connected daughter units 3 or the value of the radio signal strength between the mother unit 2 and one of the daughter units 3. Reversely, in the case that the signal strength display device 20 is disposed on the daughter unit 3, the signal strength display 13 only needs to display the value of the radio signal strength between the mother unit 2 and the daughter unit 3.

Figure 4:
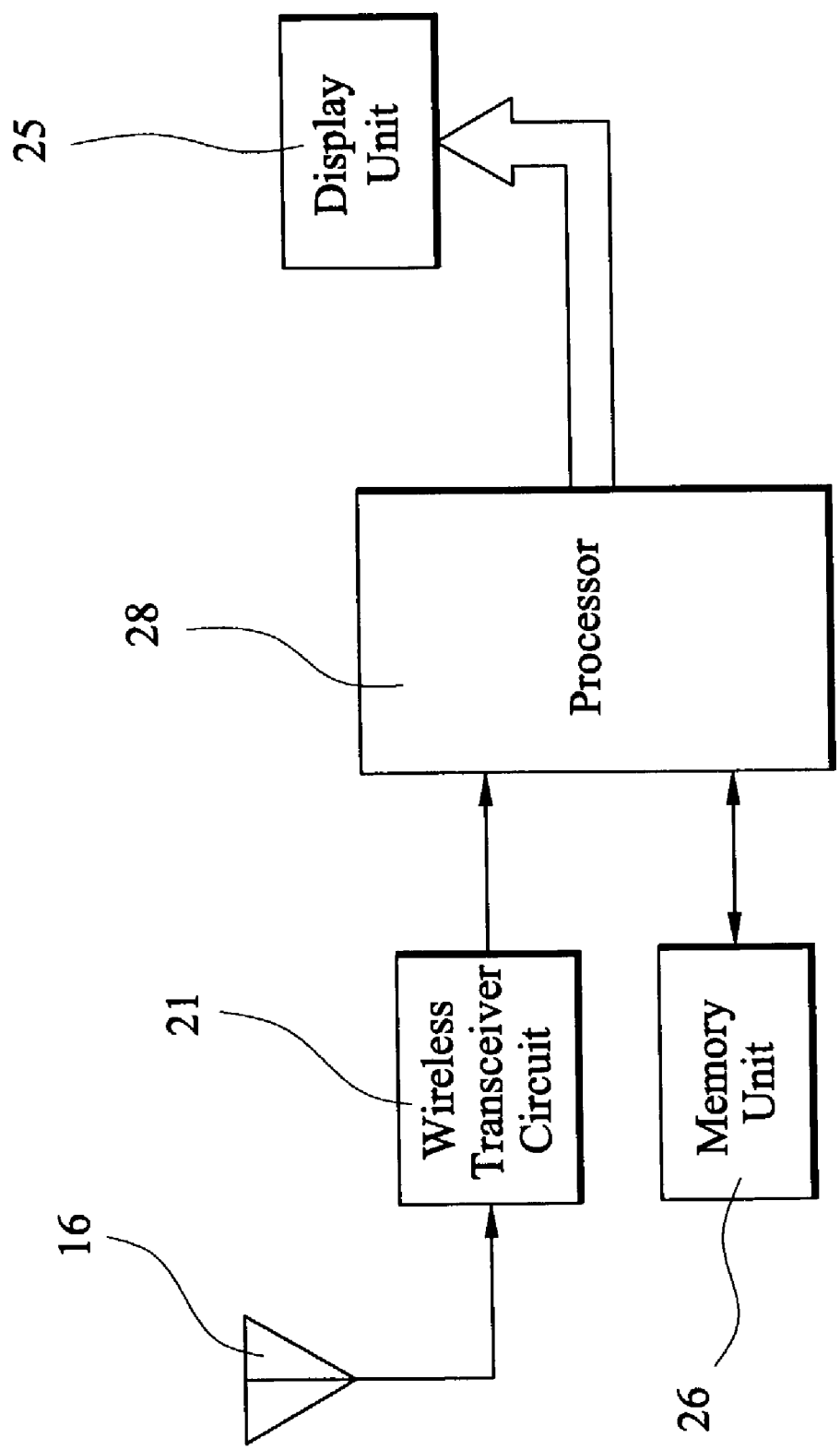
FIG. 4 is a block circuit diagram of the embodiment of the mother unit of the present invention.
Figure 5:
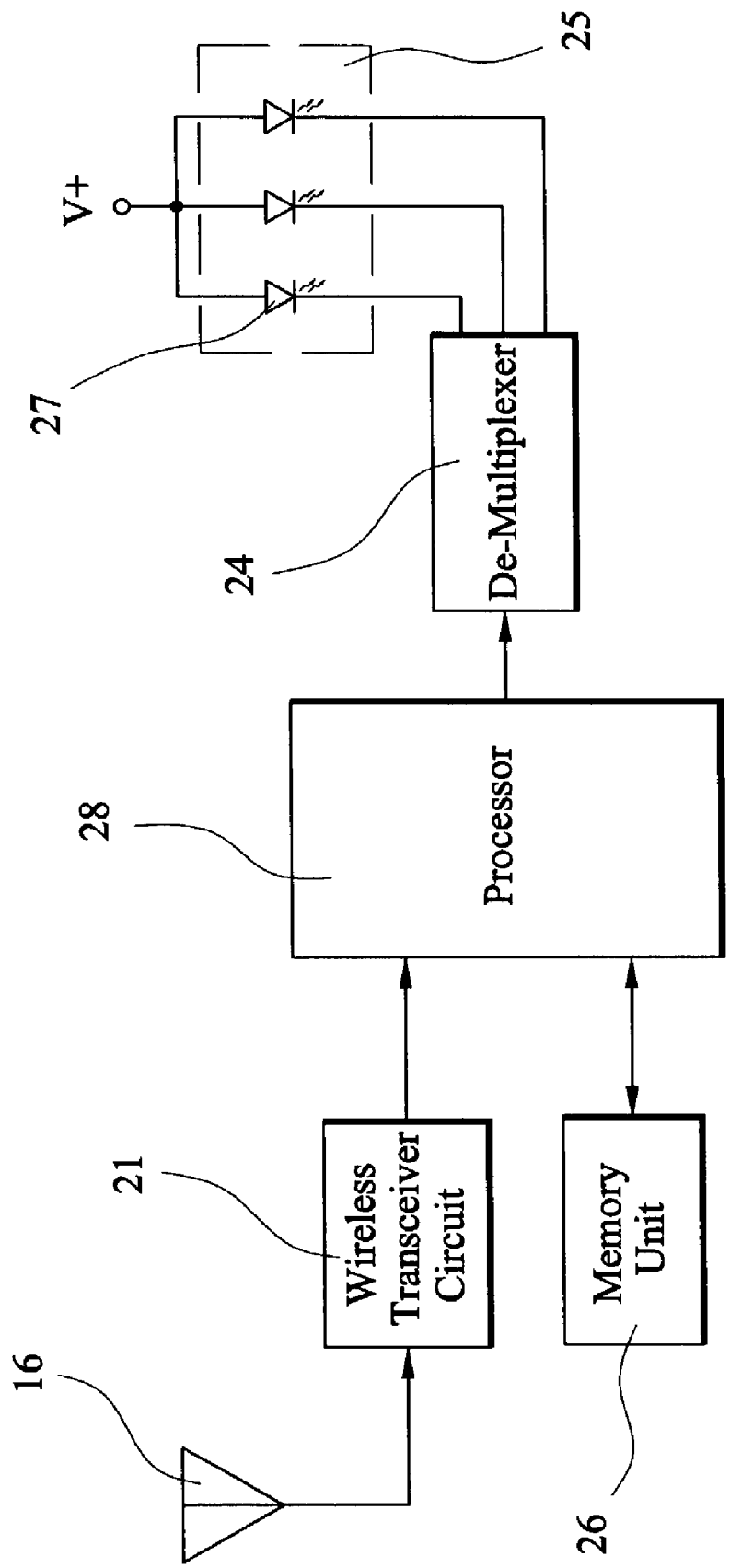
FIG. 5 is a block circuit diagram of the embodiment of the daughter unit of the present invention.

Please further also refer to FIGS. 4 and 5 which are circuit block diagrams of the embodiments of mother unit and daughter unit of the present invention. The signal strength display device 20 of the present invention is mainly composed of a wireless transceiver circuit 21, a signal analyzing unit 22, an analog-to-digital converting unit 23, a de-multiplexer 24 and a display unit 25. Said wireless transceiver circuit 21 is connected to said antenna 16 which transmits or receives radio signal for wirelessly connecting with the daughter unit 3 or mother unit 2. Said wireless transceiver circuit 21 has at least one output terminal. With respect to the mother unit 2, said wireless transceiver circuit 21 will receive the radio signals sent from the daughter units 3 one by one. In order to distinguish the received signals sent from the daughter units 3, when the daughter units 3 transmit the radio signals, said wireless transceiver circuit 21 will add a specific code to the radio signal with respect to each daughter unit 3.

Said signal analyzing unit 22 is connected to the output terminal of said wireless transceiver circuit 21 for calculating and analyzing the strength of the radio signal received by said wireless transceiver circuit 21. Said signal analyzing unit 22 serves to amplify the radio signal and then calculate the peak value and average value of the radio signal so as to generate a corresponding value. For example, numerals 0~3 are used in correspondence to the grades of signal strength. With respect to the mother unit 2, said signal analyzing unit 22 respectively analyzes the strength of the radio signals sent from the daughter units 3 and generates corresponding values one by one and record or store the values. Therefore, the present invention further includes a memory unit 26 connected with said signal analyzing unit 22 for recording or storing the values generated by said signal analyzing unit 22 respectively corresponding to the signal strength of the daughter units 3.

Said analog-to-digital converting unit 23 has at least one input terminal connected with said signal analyzing unit 22 for converting the corresponding values generated by said signal analyzing unit 22 into digital data (such as 2 bits digital data). Said analog-to-digital converting unit 23 has multiple output terminals connected to the de-multiplexer 24 which outputs the digital data to said display unit 25.

With respect to the daughter unit 3, said display unit 25 can be formed of multiple light emitting diodes 27. Said display unit 25 is mounted on the front panel 10 of the housing of the daughter unit 3 to form the signal strength display 13. In this embodiment, three light emitting diodes 27 are exemplified. The output terminals of said de-multiplexer 24 are respectively connected to the three light emitting diodes 27 for driving the same to light. In the case that the daughter unit 3 fails to receive the radio signal sent from the mother unit 2, the light emitting diodes 27 will not emit light. If the radio signal is weakened, only one light emitting diode 27 will emit light. If the radio signal has medium strength, two light emitting diodes 27 will emit light. If the radio signal is strong, the three light emitting diodes 27 will emit light at the same time.

However, with respect to the mother unit 2, said display unit 25 must be able to display the number of all the connected daughter units 3 and display the average value of the radio signal strength of all the connected daughter units 3 or the value of the radio signal strength of one single daughter unit. Therefore, in this embodiment, a liquid crystal display or multiple seven-segment displays can be used as the signal strength display 13. When it is desired to display the number of all the connected daughter units 3, said signal analyzing unit 22 calculates the number of the values recorded or stored in said memory unit 26 and generates a corresponding value. Then the analog-to-digital converting unit 23 converts the corresponding value into digital data and directly outputs the digital data to said display unit 25 to display the digital data.

When it is desired to display the average value of the signal strength of all the connected daughter units 3, said signal analyzing unit 22 reads all the values recorded or stored in said memory unit 26 and calculates the average value thereof and then generates a corresponding value. Then said analog-to-digital converting unit 23 converts the corresponding value into digital data and directly outputs the digital data to the display unit 25 to display the digital data.

When it is desired to display the value of the signal strength of a certain connected daughter units 3, said signal analyzing unit 22 reads the corresponding value of a specifically encoded daughter unit 3 recorded or stored in said memory unit 26. Then the analog-to-digital converting unit 23 converts the corresponding value into digital data and directly outputs the digital data to said display unit 25 to display the digital data.

The above procedures can be completed by software program. Therefore, in the circuit diagram of the embodiment of the mother unit, a processor 28 can be used instead of said signal analyzing unit 22, said analog-to-digital converting unit 23 and the de-multiplexer 24 (as shown in FIG. 4). In addition, a software program executed in said processor 28 is used to simulate and generate the same output result. Said processor 28 can have one input terminal and multiple output terminals. Said input terminal is connected to the output terminal of the wireless transceiver circuit 21, while said multiple output terminals are connected to the display unit 25.

The above embodiments are only used to illustrate the present invention, not intended to limit the scope thereof. Many modifications of the above embodiments can be made without departing from the spirit of the present invention.

What is claimed is:

1. A signal strength display device for a wireless Hub including a mother unit and a plurality of connected daughter units, the signal strength display device being disposed on the mother unit of the wireless Hub, comprising:

a wireless transceiver circuit for receiving or transmitting radio signals;

a signal analyzing unit connected to an output terminal of said wireless transceiver circuit for calculating and analyzing the strength of the radio signal received by said wireless transceiver circuit from each of the connected daughter units to generate a corresponding value therefore;

a memory unit connected with said signal analyzing unit storing the corresponding values generated by said signal analyzing unit for each of the connected daughter units, said signal analyzing unit reading all of the values for all of the connected daughter units and calculating an average signal strength for all of the connected daughter units, said signal analyzing unit calculating a quantity of the plurality of connected daughter units from the number of values stored in said memory unit;

an analog-to-digital converting unit having at least one input terminal connected with said signal analyzing unit for converting the corresponding value and the average signal strength generated by said signal analyzing unit into digital data; and a display unit coupled to said analog-to-digital converting unit for displaying the digital data output therefrom, said display unit displaying the quantity of the plurality of connected daughter units calculated by said signal analyzing unit, the value of signal strength of each of the connected daughter units, or the average value of the signal strength of all the connected daughter units.

2. The signal strength display device as claimed in claim 1, further comprising at least one antenna connected with said wireless transceiver circuit for receiving or transmitting radio signals.

3. The signal strength display device as claimed in claim 1, wherein said wireless transceiver circuit receives the radio signals sent from the connected daughter units one by one and adds a specific code to the radio signal with respect to each connected daughter unit to thereby distinguish the received signals from each other.

4. The signal strength display device as claimed in claim 1, wherein said signal analyzing unit calculates the peak value and average value of the radio signal so as to generate a value corresponding to the grade of strength of the signal.

5. The signal strength display device as claimed in claim 1, wherein said display unit is a liquid crystal display or includes at least one seven-segment display.

6. A signal strength display device for a wireless Hub including a mother unit and at least one daughter unit, the signal strength display device being disposed on the daughter unit of the wireless Hub, comprising:

a wireless transceiver circuit for receiving or transmitting radio signals;

a signal analyzing unit connected to an output terminal of said wireless transceiver circuit for calculating and analyzing the strength of the radio signal received by said wireless transceiver circuit to generate a corresponding value;

an analog-to-digital converting unit having at least one input terminal connected with said signal analyzing unit for converting the corresponding value generated by said signal analyzing unit into digital data;

a de-multiplexer having at least one input terminal and multiple output terminals, said input terminal being connected to said analog-to-digital converting unit; and, a display unit disposed on daughter unit, said output terminals of said de-multiplexer being connected to said display unit for displaying the digital data output by said analog-to-digital converting unit, said signal analyzing unit serving to calculate the value of signal strength of the mother unit.

7. The signal strength display device as claimed in claim 6, wherein said display unit includes multiple light emitting diodes, the output terminals of said de-multiplexer being respectively connected to said light emitting diodes, whereby the number of the lighting light emitting diodes indicates the strength of the signal.

8. A signal strength display device for a wireless Hub including a mother unit and at least one daughter unit, the signal strength display device being disposed on the mother unit of the wireless Hub, comprising:

a wireless transceiver circuit for receiving or transmitting radio signals;

a processor connected to an output terminal of said wireless transceiver circuit for calculating and analyzing the strength of the radio signal received by said wireless transceiver circuit from each of the connected daughter units to generate a corresponding value therefore, a software program being executed in said processor to simulate and generate digital data;

a memory unit connected with said processor storing the corresponding values generated by said processor for each of the connected daughter units, said processor reading all of the values for all of the connected daughter units and calculating an average signal strength for all of the connected daughter units, said processor calculating a quantity of the plurality of connected daughter units from the number of values stored in said memory unit; and, a display unit coupled to said processor for displaying the digital data output therefrom, said display unit displaying the quantity of the plurality of connected daughter units calculated by said processor, the value of signal strength of each of the connected daughter units, or the average value of the signal strength of all the connected daughter units.

* * * * *